United States Patent
Nayak et al.

(10) Patent No.: US 11,023,465 B2
(45) Date of Patent: Jun. 1, 2021

(54) CROSS-ASSET DATA MODELING IN MULTI-ASSET DATABASES

(71) Applicant: Optum, Inc., Minnetonka, MN (US)

(72) Inventors: Nagaraja Nayak, Maple Grove, MN (US); Ajay Bandi, Telangana (IN)

(73) Assignee: Optum, Inc., Minnetonka, MN (US)

( * ) Notice: Subject to any disclaimer, the term of this patent is extended or adjusted under 35 U.S.C. 154(b) by 91 days.

(21) Appl. No.: 16/405,708

(22) Filed: May 7, 2019

(65) Prior Publication Data
US 2020/0356562 A1 Nov. 12, 2020

(51) Int. Cl.
*G06F 16/245* (2019.01)
*G06F 16/2453* (2019.01)
*G06F 16/2457* (2019.01)
*G06F 16/28* (2019.01)
*G06F 16/901* (2019.01)

(52) U.S. Cl.
CPC .. *G06F 16/24544* (2019.01); *G06F 16/24573* (2019.01); *G06F 16/287* (2019.01); *G06F 16/9024* (2019.01)

(58) Field of Classification Search
None
See application file for complete search history.

(56) References Cited

U.S. PATENT DOCUMENTS

| | | | | |
|---|---|---|---|---|
| 8,775,517 B1 * | 7/2014 | Goldman | ............ | G06F 16/9535 709/204 |
| 2014/0304251 A1 * | 10/2014 | Bornea | ............ | G06F 16/24542 707/718 |
| 2014/0337373 A1 * | 11/2014 | Morsi | ............ | G06F 16/245 707/769 |
| 2015/0074044 A1 * | 3/2015 | Metreveli | ............ | G06F 16/2343 707/609 |
| 2015/0169758 A1 * | 6/2015 | Assom | ............ | G06F 16/36 707/603 |
| 2017/0147709 A1 * | 5/2017 | Ganz | ............ | G06F 16/9027 |
| 2019/0334779 A1 * | 10/2019 | Woodward | ........ | G06F 16/90335 |

OTHER PUBLICATIONS

"Demo of Linkurious Enterprise," [online], (1 page). [Retrieved From the Internet Sep. 4, 2019] <https://crunchbase.linkurio.us/demo/>.

(Continued)

*Primary Examiner* — Son T Hoang
(74) *Attorney, Agent, or Firm* — Alston & Bird LLP

(57) ABSTRACT

There is a need for solutions that perform cross-asset data modeling in a multi-asset database. This need can be addressed by, for example, receiving a request for an execution plan for a merger of a first data entity and a second data entity in the database; determining, based at least in part on a traversal graph of the database, possible paths for the execution plan, wherein each possible path is associated with an ordered combination of path relationships in the database; determining a cost for each possible path based at least in part on at least one of a strength measure associated with each path relationship for the possible path, a traversal cost measure for each path relationship for the possible path, and an experiential usage measure for the possible path; and selecting a recommended path based at least in part on each cost for a possible path.

20 Claims, 8 Drawing Sheets

(56) References Cited

OTHER PUBLICATIONS

"First Visualization: Inspect Data," Linkurious User Manual 2.5.6, [online], (4 pages). [Retrieved From the Internet Sep. 27, 2018] <https://doc.linkurio.us/user-manual/latest/visualization-inspect/>.

"Linkurious: The Graph Intelligence Platform," YouTube Video, Linkurious, Sep. 24, 2018. [Retrieved From the Internet Sep. 4, 2019] <https://www.youtube.com/watch?v=Avz82-2OQmw>.

"Visualizing JanusGraph With the KeyLines Graph Visualization Toolkit," YouTube Video, Cambridge Intelligence, Jan. 19, 2018. [Retrieved From the Internet Sep. 4, 2019] <https://www.youtube.com/watch?v=44CsU1Jy4iQ>.

Boyd, Ryan. "Intro to Graphs and Neo4j," YouTube Video, Apr. 17, 2015. [Retrieved From the Internet Sep. 4, 2019] <https://www.youtube.com/watch?v=Go3P73-KV30>.

Harwood, Mark. "Working With DBpedia Data Using Graph in Elastic Stack 5.4," YouTube Video, May 8, 2017. [Retrieved From the Internet Sep. 4, 2019] <https://www.youtube.com/watch?v=ZzWT-2xdaek>.

Selwan, Marc. "Getting the Hang of Using the DataStax Graph Loader: The Basics," Mar. 21, 2017, [online], (8 pages). [Retrieved From the Internet Aug. 13, 2019] <https://www.datastax.com/dev/blog/dgl-basics>.

\* cited by examiner

CROSS-ASSET DATA MODELING IN MULTI-ASSET DATABASES

BACKGROUND

Modeling a database is essential for effective and efficient utilization of the database to perform data analysis. However, in complex databases with multiple data assets and complex relationships between those data assets, it is a challenge to properly model relationships between data assets. In particular, in today's business context, it has become a fundamental need to merge data across different data assets to discover meaningful insights needed for technical and business applications. For instance, in a database associated with a medical institution such as health insurance provider institution, there may be a need to determine encounters between a member (whose information may be in a member data asset) and a provider (whose information are may a provider data asset) at a specific clinic (where such information may be in a claims data asset). Performing such a complex query involves merging information across multiple data assets. Such scenarios are common and they poses many challenges for data analysis systems. Thus, there is an unmet technical need for more effective solutions for modeling databases across data assets.

BRIEF SUMMARY

In general, embodiments of the present invention provide methods, apparatus, systems, computing devices, computing entities, and/or the like for data modeling across data assets. Certain embodiments utilize systems, methods, and computer program products that enable entity-relationship visualization and query processing across multiple data assets.

In accordance with one aspect, a method is provided. In one embodiment, the method comprises receiving a request for generating an execution plan for a merger of a first data entity of the plurality of data entities and a second data entity of the plurality of data entities; obtaining a traversal graph of the plurality of data assets, wherein the traversal graph indicates one or more entity relationships and each entity relationship of the one or more entity relationships is associated with a third data entity of the plurality of data entities and a fourth data entity of the plurality of data entities; determining, based at least in part on the traversal graph, one or more possible paths for the execution plan, wherein each possible path of the one or more possible paths is associated with an ordered combination of one or more path relationships of the one or more entity relationships that begins with the first data entity and ends with the second data entity; determining a cost for each possible path of the one or more possible paths based at least in part on at least one of a strength measure associated with each path relationship of the one or more path relationships in the ordered combination for the possible path, a traversal cost measure for each path relationship of the one or more path relationships in the ordered combination for the possible path, and an experiential usage measure for the possible path; selecting a recommended path from the one or more possible paths based at least in part on each cost for a possible path of the one or more possible paths; and generating a recommendation output via a display interface based at least in part on the recommended path.

In accordance with another aspect, a computer program product is provided. The computer program product may comprise at least one computer-readable storage medium having computer-readable program code portions stored therein, the computer-readable program code portions comprising executable portions configured to receive a request for generating an execution plan for a merger of a first data entity of the plurality of data entities and a second data entity of the plurality of data entities; obtain a traversal graph of the plurality of data assets, wherein the traversal graph indicates one or more entity relationships and each entity relationship of the one or more entity relationships is associated with a third data entity of the plurality of data entities and a fourth data entity of the plurality of data entities; determine, based at least in part on the traversal graph, one or more possible paths for the execution plan, wherein each possible path of the one or more possible paths is associated with an ordered combination of one or more path relationships of the one or more entity relationships that begins with the first data entity and ends with the second data entity; determine a cost for each possible path of the one or more possible paths based at least in part on at least one of a strength measure associated with each path relationship of the one or more path relationships in the ordered combination for the possible path, a traversal cost measure for each path relationship of the one or more path relationships in the ordered combination for the possible path, and an experiential usage measure for the possible path; select a recommended path from the one or more possible paths based at least in part on each cost for a possible path of the one or more possible paths; and generate a recommendation output via a display interface based at least in part on the recommended path.

In accordance with yet another aspect, an apparatus comprising at least one processor and at least one memory including computer program code is provided. In one embodiment, the at least one memory and the computer program code may be configured to, with the processor, cause the apparatus to receive a request for generating an execution plan for a merger of a first data entity of the plurality of data entities and a second data entity of the plurality of data entities; obtain a traversal graph of the plurality of data assets, wherein the traversal graph indicates one or more entity relationships and each entity relationship of the one or more entity relationships is associated with a third data entity of the plurality of data entities and a fourth data entity of the plurality of data entities; determine, based at least in part on the traversal graph, one or more possible paths for the execution plan, wherein each possible path of the one or more possible paths is associated with an ordered combination of one or more path relationships of the one or more entity relationships that begins with the first data entity and ends with the second data entity; determine a cost for each possible path of the one or more possible paths based at least in part on at least one of a strength measure associated with each path relationship of the one or more path relationships in the ordered combination for the possible path, a traversal cost measure for each path relationship of the one or more path relationships in the ordered combination for the possible path, and an experiential usage measure for the possible path; select a recommended path from the one or more possible paths based at least in part on each cost for a possible path of the one or more possible paths; and generate a recommendation output via a display interface based at least in part on the recommended path.

BRIEF DESCRIPTION OF THE DRAWINGS

Figure 1:
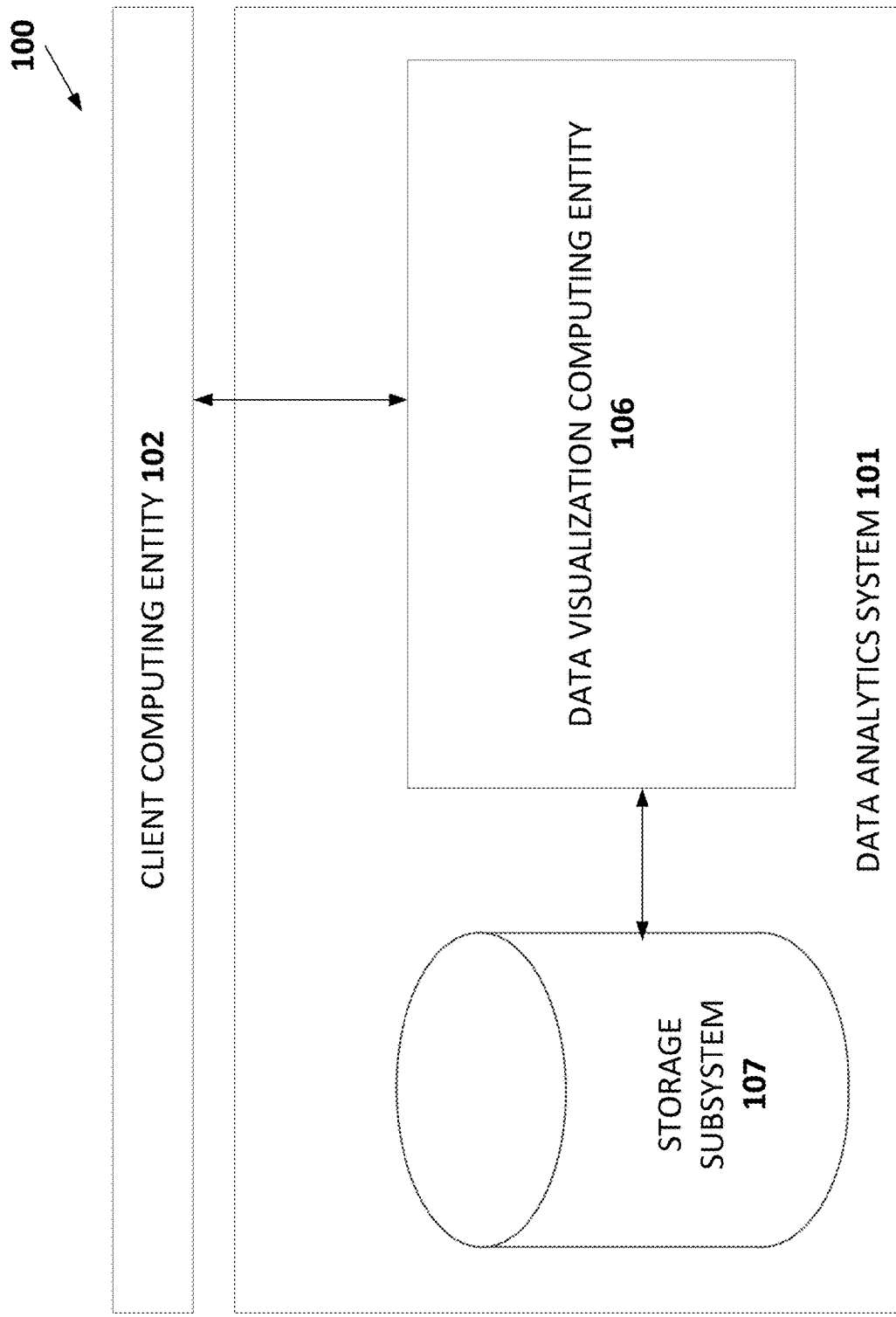

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
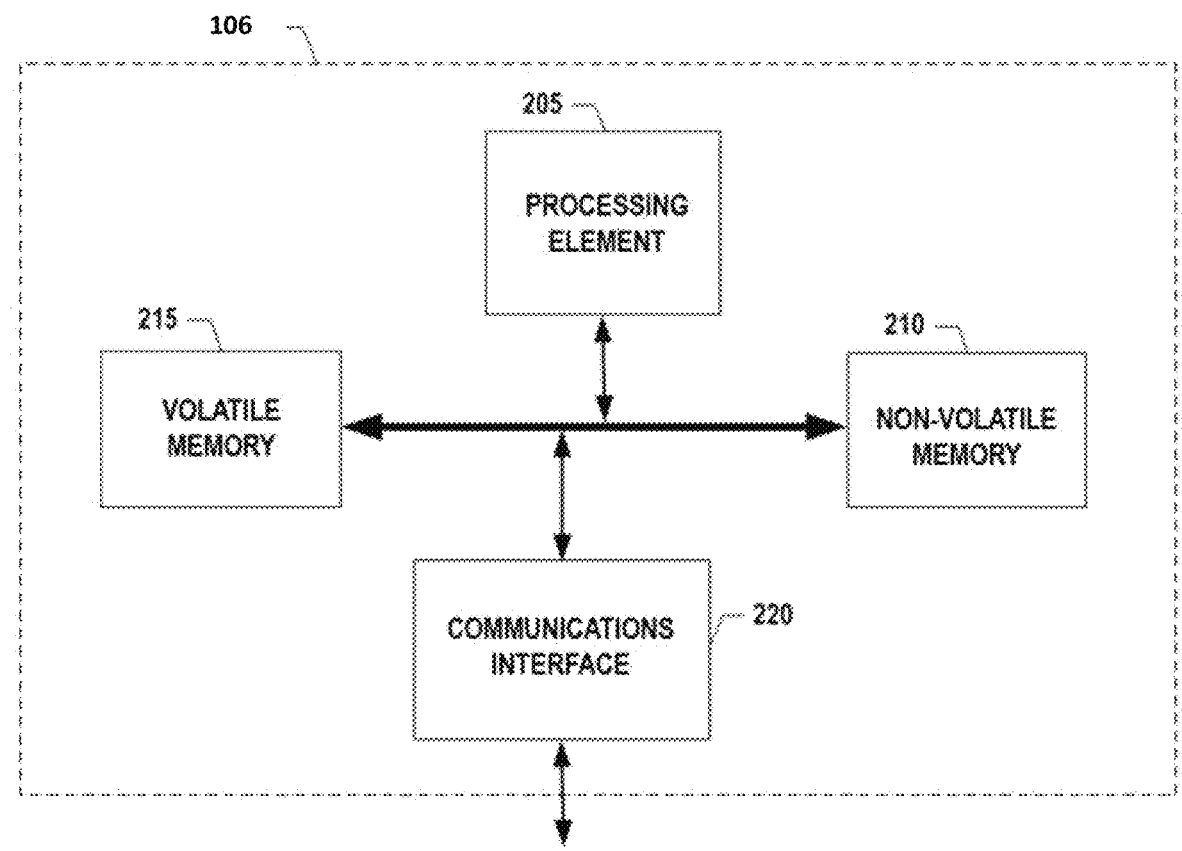

FIG. 2 provides an example data visualization computing entity in accordance with some embodiments discussed herein.

Figure 3:
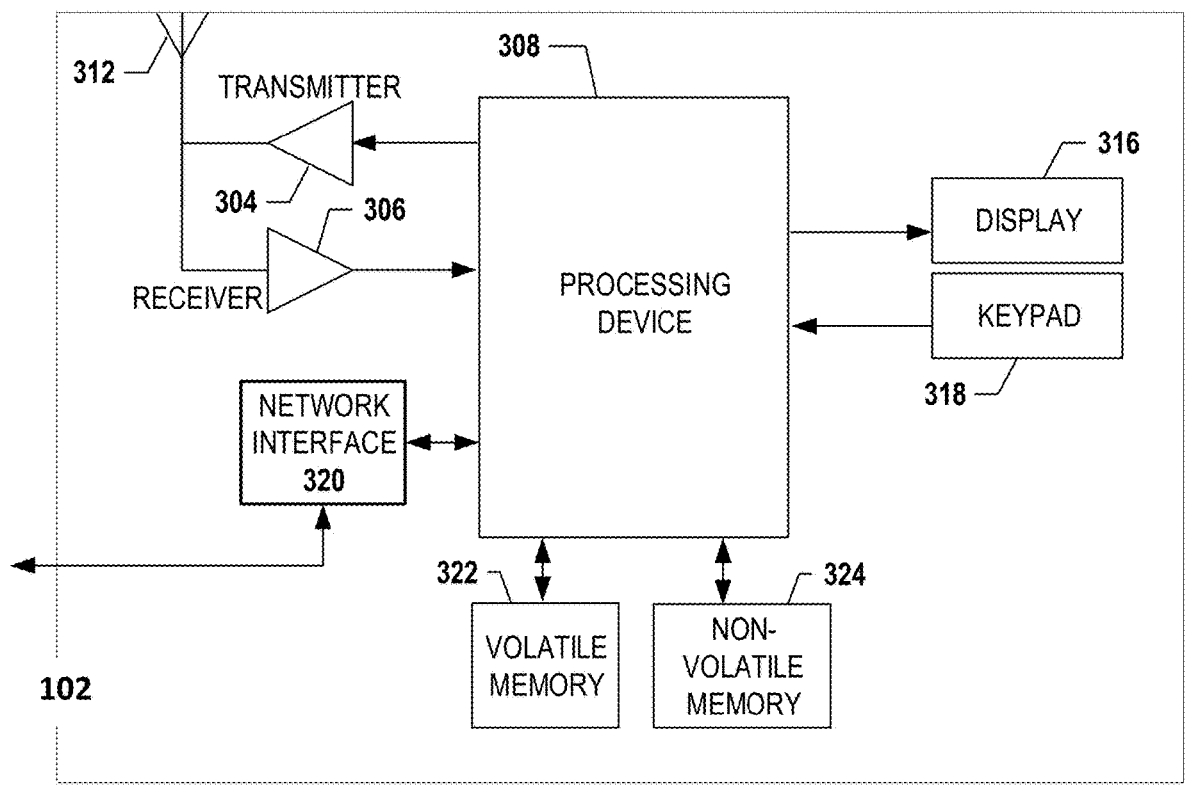

FIG. 3 provides an example client computing entity in accordance with some embodiments discussed herein.

Figure 4:
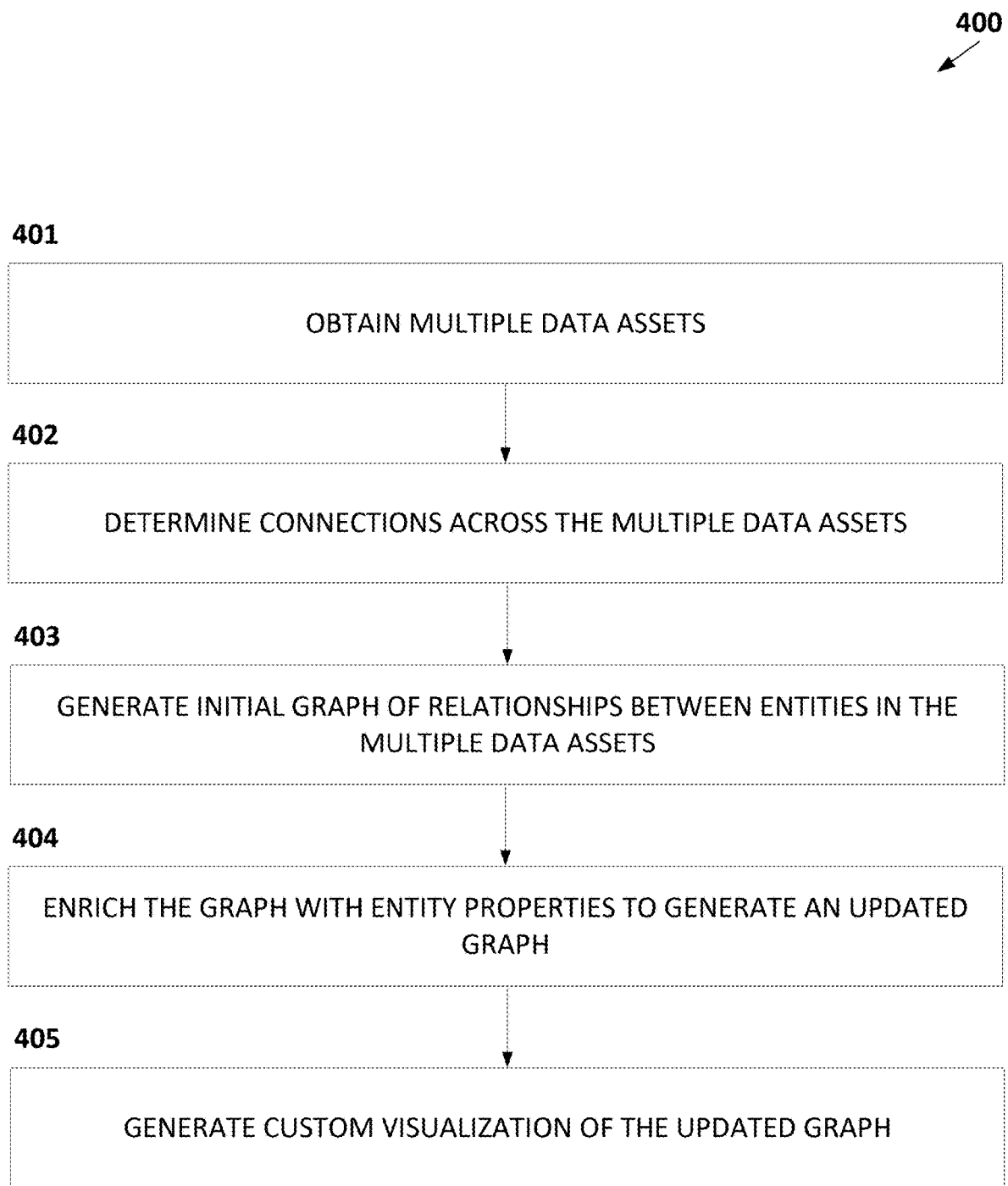

FIG. 4 provides a flowchart diagram of a process generating a custom visualization of data in multiple data assets in accordance with some embodiments discussed herein.

Figure 5:
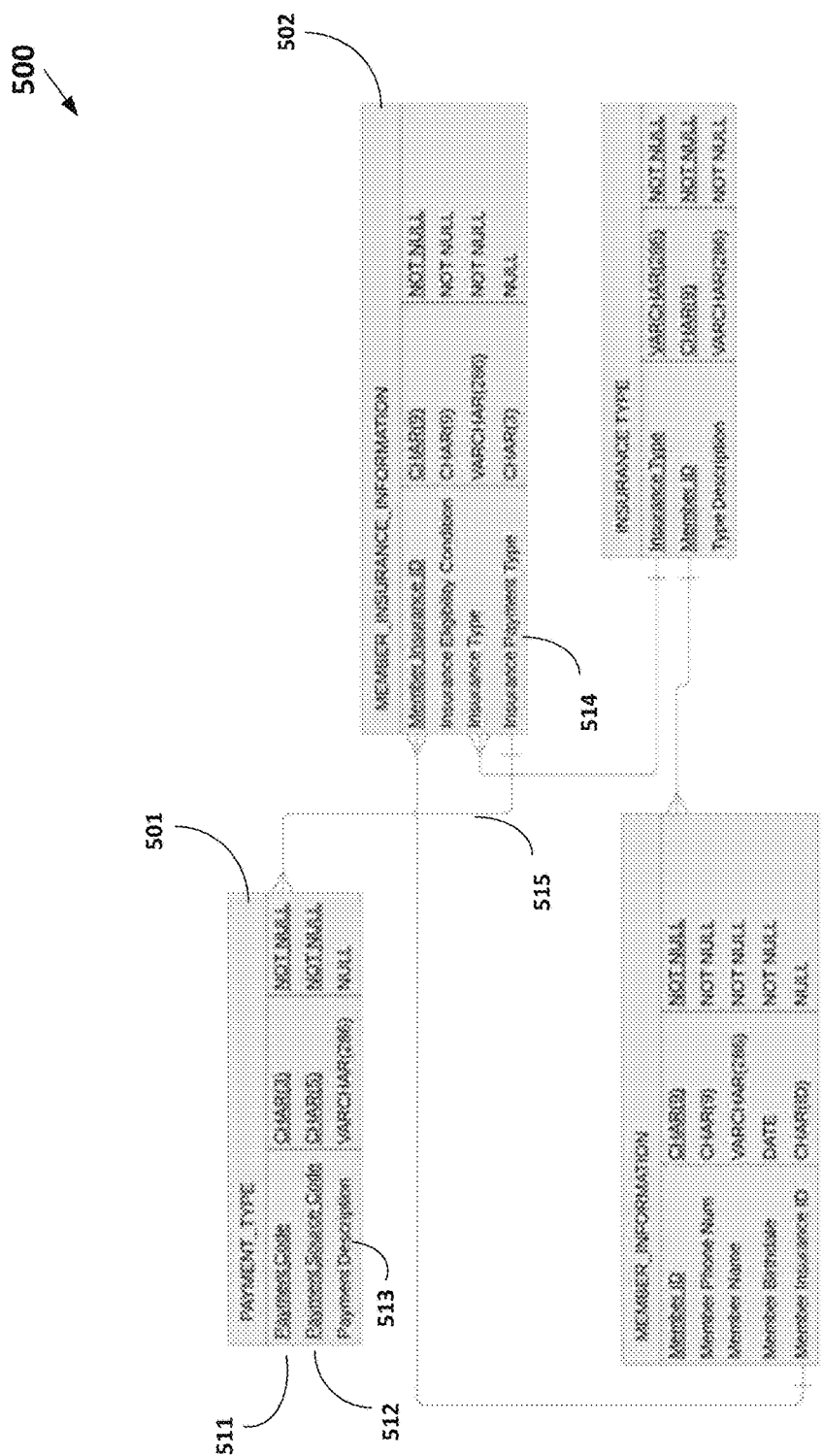

FIG. 5 provides an operational example of a data model for a data asset in accordance with some embodiments discussed herein.

Figure 6:
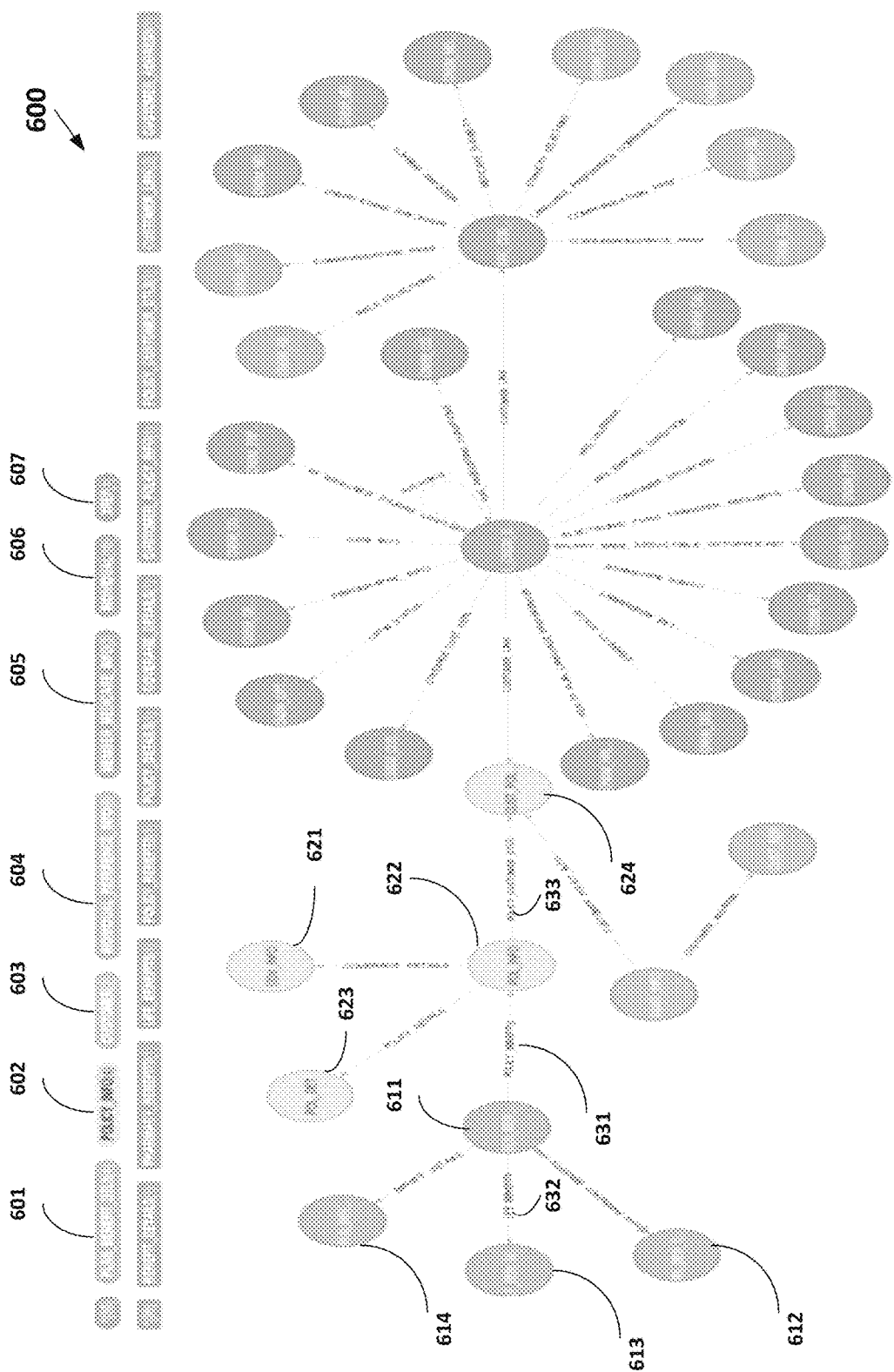

FIG. 6 provides an operational example of a traversal graph for multiple data assets in accordance with some embodiments discussed herein.

Figure 7:
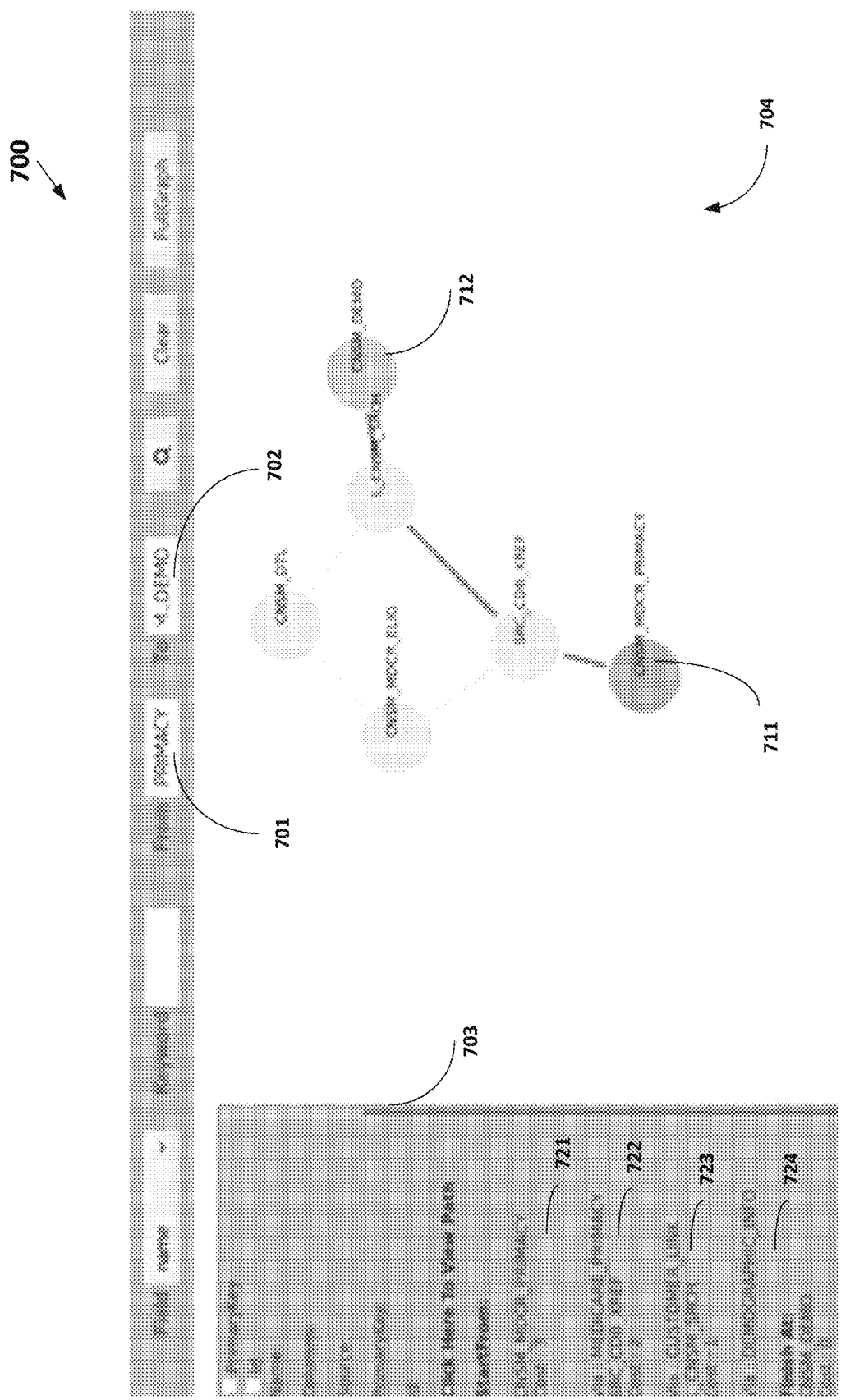

FIG. 7 provides an operational example of a custom visualization user interface in accordance with some embodiments discussed herein.

Figure 8:
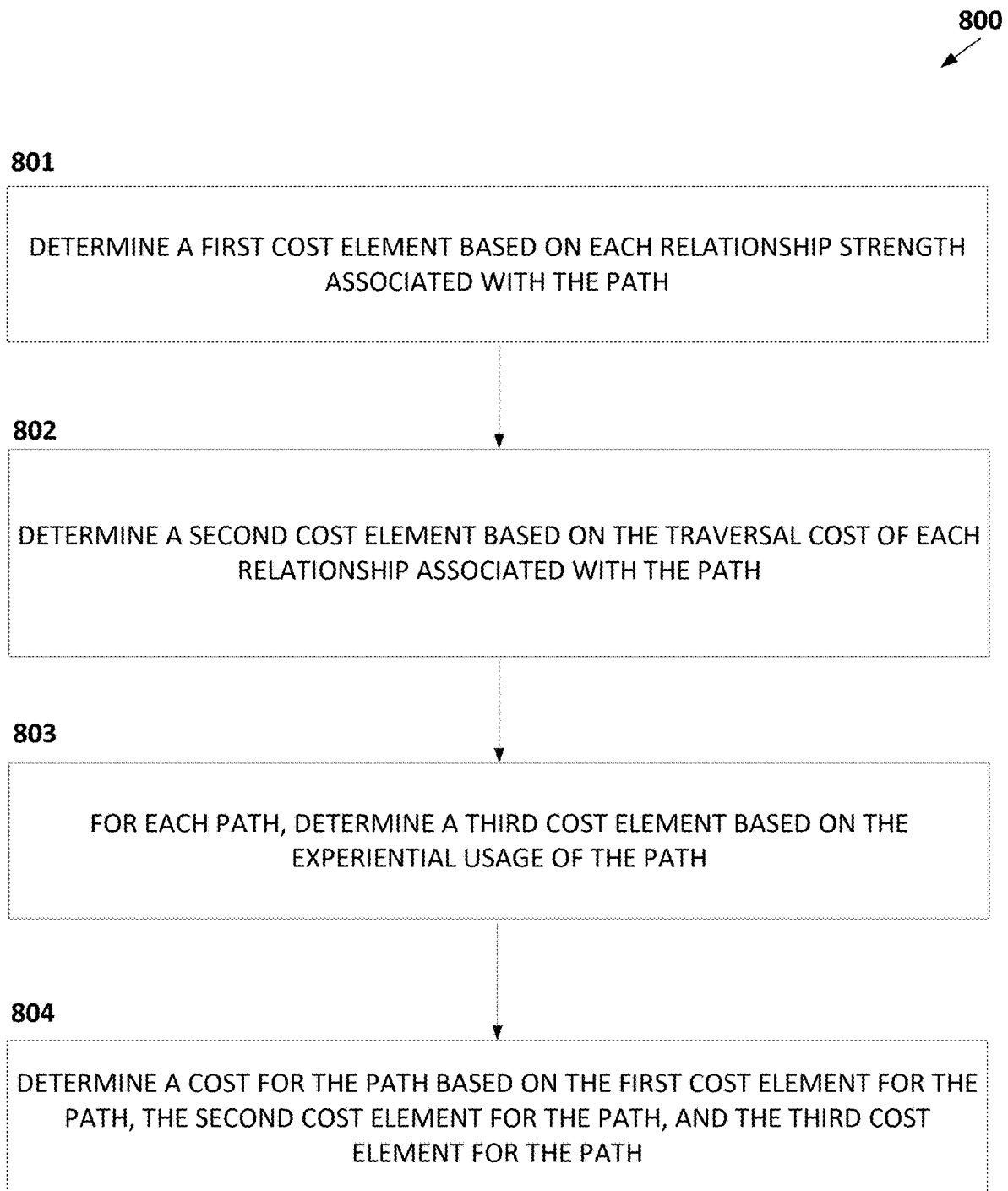

FIG. 8 provides a flowchart diagram of a process for determining a cost for a path between two data entities in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview

Discussed herein methods, apparatus, systems, computing devices, computing entities, and/or the like for data visualization and path generation in a multi-asset database. As will be recognized, however, the disclosed concepts can be used to reminder a user to perform any type of data analysis in a multi-asset database, such as path generation without data visualization in a multi-asset database.

A. Technical Problems

Modeling a database is essential for effective and efficient utilization of the database to perform data analysis. However, in complex databases with multiple data assets and complex relationships between those data assets, it is a challenge to properly model relationships between data assets. In particular, in today's business context, it has become a fundamental need to merge data across different data assets to discover meaningful insights needed for technical and business applications. For instance, in a database associated with a medical institution such as health insurance provider institution, there may be a need to determine encounters between a member (whose information may be in a member data asset) and a provider (whose information are may a provider data asset) at a specific clinic (where such information may be in a claims data asset). Performing such a complex query involves merging information across multiple data assets. Such scenarios are common and they poses many challenges for data analysis systems. Thus, there is an unmet technical need for more effective solutions for modeling databases across data assets.

Some existing data modeling solutions rely on subject matter expertise (SME) to model relationships across data assets. Such solutions suffer from drawbacks related to the limited availability of domain SME contributions, difficulty of integrating SME contributions to other relevant metrics associated with data models, and shortcomings of SME contributions in understanding proper complexity of complex databases. For example, some solutions that rely on SME contributions often fail to properly and effectively model complex databases because they cannot properly filter and incorporate SME contributions in an attempt to build comprehensive and effective models of data across various data assets. Thus, in addition to the costly use of SME expertise, many SME-based solutions indeed fail to provide comprehensive solutions that provide reliable recommendations and estimations for cross-asset mergers in complex databases. Therefore, SME-based solutions fail to address the unmet technical need for more effective solutions for modeling databases across data assets.

Other existing data modeling solutions rely on entity-relationship (ER) models to map relationships between data assets. Such solutions typically create and maintain ER models that, in practice, are specific to particular subject areas, source systems, and/or data assets. Because of their specificity and limited cross-domain applications, ER-based solutions are typically isolated, nonstandard, and stand-alone. In some instances, when used for cross-asset purposes, ER based solutions fail to effectively and properly capture complexities of multi-asset database systems. For example, many ER solutions lack cross-system applications when applied to other database systems and fail to generalize in a manner that ensures system reliability in cross-domain contexts. Therefore, ER-based solutions also fail to address the unmet technical need for more effective solutions for modeling databases across data assets.

Thus, existing solutions cannot give an enterprise wide view of entities and their relationships across various data assets. Because of shortcomings of those solutions, when those solutions are utilized, the efforts to create such an enterprise wide model will be enormous and the actual readership and accessibility of such a master model will be low due to readability and cost challenges. This limits the consumption value of the optimal models generated by existing solutions and leaves an unmet need for the users who wants to understand and study the entities and their relationships at a closer level. The shortcomings of existence solutions also imposes huge costs on tasks that require cross-asset database interaction, such as enormous costs associated with long cycles of data extraction and data analysis.

B. Technical Solutions

One innovative aspect of the present invention maps entity relationships across data assets using graphs and defines the problem of finding optimal relationships as a graph traversal problem similar to problems defined in route-planning applications. Thus, one innovative aspect of the present invention views a task of merging two data entities as an attempt to find an optimal path between the two entities, where a path may be characterized by relationships between entities. For example, a possible path for a merger of data entities A and C can use the relationships AB and BC. By defining entity relationships across data assets using nodes and edges in a graph, the present invention enables a lucid illustration of cross-asset relationships at the enterprise level which is searchable, viewable and navigable with different visualization layouts.

The data mapping solutions offered by aspects of the present invention enable integrating various kinds of inputs as a way to model complexities of cross-asset relationships, such as complexities associated with cross-asset connections as well as cross-asset merger costs. For example, using various types of input data such as SME data, aspects of the present invention map cross-asset relationship and intra-asset relationships using a graph where nodes correspond to data entities and edges correspond to relationships. In addition, using various factors such as physical resource costs, data profiling statistics, and experiential usage parameters, aspects of the present invention enable modeling merger costs in a manner that is intuitive and easy to integrate with various types of data. Furthermore, by separating the presence of a relationship from cost of a relationship, aspects of the present invention enable representing cross-asset relationships in data models while accounting for costs associated with cross-asset inferences because of resource costs involved. Thus, various embodiments of the present invention address the unmet technical need for more effective solutions for modeling data across multiple data assets.

Furthermore, unlike existing data modeling solutions that suffer from drawbacks related to elusive information, aspects of the present invention render an interactive visualization of such elusive information for use on a self-service basis. This enables and eases use cases which are challenging to handle using existing solutions, such as user queries to join multiple entities spread across different data assets. For example, aspects of the present solution may process such queries by returning a subgraph with the possible paths connecting the two entities. In this way, aspects of the present invention improve user experience in interacting with data modeling solutions for complex databases, such as data modeling solutions for complex databases that have a large number of data assets.

Moreover, the graph-based representation described by aspects of the present invention enable self-service discovery of entities and their relationships across data assets with minimal dependency on SME contributions, discovery of latent use cases from possible traversal paths, auto query generation using traversal paths between entities, etc. In these and other ways, various aspects of the present invention address the unmet technical need for more effective solutions for modeling databases across data assets.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

The architecture 100 includes one or more client computing entities, such as the client computing entity 102, that interacts with a data analytics system 101 via a communication network (not shown). The data analytics system 101 includes a storage subsystem 107 and a data visualization computing entity 106. Each computing entity, computing subsystem, and/or computing system in the architecture 100 may include any suitable network server and/or other type of processing device. The communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.).

In some embodiments, the architecture 100 is configured to provide custom visualizations of data in multiple data assets in response to requests for such custom visualization from client computing entities. For example, the client computing entity 102 may, in response to a user request by a user, transmit a request for a custom visualization of multiple data assets from the data visualization computing entity 106 of the data analytics system 101. The data visualization computing entity 106 may in turn generate the custom visualization using the data stored in the storage subsystem 107 of the data analytics system 101 and present the custom visualization to the client computing entity 102, e.g., for display to the user of the client computing entity 102.

The client computing entity 102 is configured to receive user requests for custom visualizations of data from a user of the client computing entity 102 and transmit the noted user requests to the data visualization computing entity 106. Furthermore, the client computing entity 102 may be configured to detect user interactions with a custom visualization user interface (UI), such as user search requests or user requests for a recommended path for merger of two data entities, and transmit requests corresponding to the detected user interactions to the data visualization computing entity 106. Moreover, client computing entity 102 may be configured to receive data corresponding to various views of the custom visualization and display such data to the user as modifications to the custom visualization. The client computing entity 102 may be configured to execute a software application for enabling user interactions with a custom visualization of data, such as a web browser software application or a native application associated with a graph database solution.

The data visualization computing entity 106 is configured to generate data corresponding to custom visualizations of various data assets. For example, the data visualization computing entity 106 may be configured to generate custom visualizations that depict relationships across multiple data assets and enable various search and path recommendation functionalities for cross-asset merger of data. The data visualization computing entity 106 may generate custom visualizations using properties of data that are precomputed and stored in the storage subsystem 107 and/or using properties of data that the data visualization computing entity 106 computes (e.g., at runtime) based at least in part on various data assets stored in the storage subsystem 107.

The storage subsystem 107 may include one or more storage units, such as multiple distributed storage units that are connected through a computer network. Each storage unit in the storage subsystem 107 may store at least one of one or more data assets and/or one or more data about the computed properties of one or more data assets. Moreover, each storage unit in the storage subsystem 107 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Data Visualization Computing Entity

FIG. 2 provides a schematic of a data visualization computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the data visualization computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the data visualization computing entity 106 may include or be in communication with one or more processing elements 205 (also referred to as processors, processing circuitry, and/or similar terms used herein interchangeably) that communicate with other elements within the data visualization computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the data visualization computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the data visualization computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the data visualization computing entity 106 with the assistance of the processing element 205 and operating system.

As indicated, in one embodiment, the data visualization computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the data visualization computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the data visualization computing entity 106 may include or be in communication with one or more input elements, such as a keyboard input, a mouse input, a touch screen/display input, motion input, movement input, audio input, pointing device input, joystick input, keypad input, and/or the like. The data visualization computing entity 106 may also include or be in communication with one or more output elements (not shown), such as audio output, video output, screen/display output, motion output, movement output, and/or the like.

As will be appreciated, one or more of the management computing entity's 100 components may be located remotely from other data visualization computing entity 106 components, such as in a distributed system. Furthermore, one or more of the components may be combined and additional components performing functions described herein may be included in the data visualization computing entity 106. Thus, the data visualization computing entity 106 can be adapted to accommodate a variety of needs and circumstances. As will be recognized, these architectures and descriptions are provided for exemplary purposes only and are not limiting to the various embodiments.

B. Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the data visualization computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the data visualization computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user computing entity's 121 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information from the data visualization computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the data visualization computing entity 106 and/or various other computing entities.

In another embodiment, the client computing entity 102 may include one or more components or functionality that are the same or similar to those of the data visualization computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like.

In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event. For example, the AI computing entity may be configured to retrieve and/or execute a particular program (e.g., the described cognitive evaluation game) in response to an audible, vocal request from a user (e.g., a user speaking an instruction to the AI computing entity to execute the particular program).

IV. Exemplary System Operation

The operation of various embodiments of the present invention will now be described. As discussed herein, various embodiments are directed to systems and methods for custom data visualization and merger path recommendation in a database with multiple data assets. The disclosed techniques enable data modeling systems and/or query processing systems that are adapted to enhance user experience and/or increase efficiency of database management in complex databases, e.g., complex database with a large number of data assets.

FIG. 4 depicts a flowchart diagram of a process 400 for generating custom visualizations of data in a multi-asset database. The process 400 may be performed by a system of one or more computers, such as by the data visualization computing entity 106 of the data analytics system 101. Via the various operations of process 400, the system can provide effective custom visualization and/or merger path recommendation solutions in databases that have multiple data assets.

At step/operation 401, data visualization computing entity 106 obtains multiple data assets. In some embodiments, each data asset contains indications of a plurality of data entities and indications of one or more relationships between the plurality of data entities, where each relationship between the plurality of data entities indicates a connection between at least two data entities of the plurality of data entities. For example, a relationship between two data entities in a data asset may indicate that a first data field of a first data entity of the two data entities contains values that are determined based at least in part on (e.g., are equivalent to) a second data field of a second data entity of the two data entities.

In some embodiments, the data visualization computing entity 106 determines data associated with the entities and their relationships from data defining an existing data model for at least one data asset of the multiple data assets. In some embodiments, the data visualization computing entity 106 generates the data defining the existing data model for at least one data asset of the multiple data assets. For example, data visualization computing entity 106 may analyze a database to reverse engineer a data model for one or more relational data tables associated with the database and uses the reverse-engineered data model to generate data defining the data model for the database. To perform the reverse-engineering, data visualization computing entity 106 may utilize user-supplied data, such as user-supplied data defining one or more data entities and/or one or more entity relationships associated with a database. For example, data visualization computing entity 106 may use user-supplied data that includes SME contribution to understanding structure of the database to perform the reverse-engineering. In some embodiments, data visualization computing entity 106 may obtain multiple data assets by obtaining data defining existing data models for a first group of the multiple data assets and generate data defining existing models for a second group of the multiple data assets.

In some embodiments, to obtain the multiple data assets, the data visualization computing entity 106 obtains an initial representation of the multiple data assets and preprocesses the initial representation of the multiple data assets to convert each data asset of the multiple data assets to a format associated with a graph database solution. For example, for some graph-based database solutions, the data visualization computing entity 106 may convert data associated with each data asset of the multiple assets into a comma separated value (CSV) format. Examples of graph database solutions include Neo4J, Amazon Neptune, JanusGraph, ArangoDB, etc.

In some embodiments, the plurality of entities associated with at least one data asset of the multiple data assets include a plurality of relational tables associated with a relational database. The example data model 500 of FIG. 5 provides an operational example of a data model for such a data asset. As depicted in the data model 500, the corresponding data asset includes four entities, such as the entity 501 associated with the PAYMENT_TYPE table and entity 502 associated with the MEMBER_INSURANCE_INFORMATION table. Each entity of the data asset includes multiple data fields. For example entity 501 includes the "Payment Code" data field 511, the "Payment Source Code" data field 512, and the "Payment Description" data field 513, where the "Payment Code" data field 511 and the "Payment Source Code" data field 512 are deemed key data fields (e.g., primary key data fields), as indicated by the underlining of the feature data associated with those data fields in the data model 500.

In the data model 500 of FIG. 5, each connection between two entities is a relationship between the two entities which indicates that a first data field of a first entity of the two data entities is equivalent to a second data field of a second entity of the two data entities. For example, the connection 515 between the entity 501 and the entity 502 is a relationship between the entity 501 and the entity 502 which indicates that the "Payment Code" data field 511 of the entity 501 is equivalent to the "Insurance Payment Type" data field 514 of the entity 502.

At step/operation 402, the data visualization computing entity 106 determines connections across the multiple data assets obtained in step/operation 401. In some embodiments, a connection across a plurality of data assets indicates a relationship involving at least one data entity from each data asset of the plurality of data assets. For example, a connection between two data assets may indicate that a first data field of a first data entity in a first data asset of the two data assets contains values that are determined based at least in part on (e.g., are equivalent to) a second data field of a second data entity in a second data asset of the two data assets. In some embodiments, a connection between two data assets may indicate that a first data field of a first relational data table in a first data asset of the two data assets contains values that are equivalent to a second data field of a second relational data table in a second data asset of the two assets.

In some embodiments, the data visualization computing entity 106 determines connections across the multiple data assets by utilizing user-supplied data, for example user-supplied data that includes SME contributions. In some embodiments, the data visualization computing entity 106 utilizes an identity management solution (IDM) to determine connections across the multiple data assets. For example, the data visualization computing entity 106 may utilize an IDM to determine equivalence and/or dependency relationships between data fields in two or more data assets, and uses the determined equivalence and/or dependency relationships to determine connections between the two or more data assets. Examples of IDMs include the Provider Master Data Management solution, Individual Master Data Management solution, etc. In some embodiments, the data visualization computing entity 106 determines a first group of connections across multiple data assets by using SME data and determines a second group of connections across the multiple data assets by leveraging an IDM.

In some embodiments, the data visualization computing entity 106 uses a trained machine learning model, such as a trained machine learning model that utilizes natural language processing, to determine connections across the multiple data assets. For example, the data visualization computing entity 106 may utilize a trained machine learning model that utilizes natural language processing to determine lexical and/or semantic relationships between data fields in two or more data assets, and uses the determined lexical and/or semantic relationships to determine connections between the two or more data assets. In some embodiments, data visualization computing entity 106 determines a first group of connections across multiple data assets by using SME data, determines a second group of connections across the multiple data assets by leveraging an IDM, and determines a third group of connections across the multiple data assets by utilizing a trained machine learning model, such as a trained machine learning model that utilizes natural language processing.

At step/operation 403, data visualization computing entity 106 generates an initial traversal graph of relationships between entities in the multiple data assets. In some embodiments, data visualization computing entity 106 populates a graph database solution with nodes representing entities in the multiple data assets and edges representing relationships between the entities, where a relationship between two entities in two data assets may be determined based at least in part on a cross-asset relationship between the entities determined in step/operation 402. In some embodiments, to populate the graph database solution in the noted manner, the data visualization computing entity 106 uses a preprocessed version of the multiple data assets converted to a format associated with the particular graph database solution (e.g., the CSV format for some graph database solutions) as well as one or more functionalities offered by the particular graph database solution to generate a graph based at least in part on underlying data in a particular format (e.g., the LOAD CSV functionality in Neo4J).

For example, given two data assets A and B, where the data asset A includes data entities {A1, A2, A3} and entity relationships {A1A2, A2A3} and data asset B includes data entities {B1, B2, B3, B4} and entity relationships {B1B2, B1B3, B1B4}, and further given the cross-asset connections {A1B1, A2B3} between the data assets A and B, the data visualization computing entity 106 may generate an initial traversal graph with seven nodes and seven edges, where each node is associated with one of {A1, A2, A3, B1, B2, B3, B4} and each edge between two nodes is associated with one of {A1A2, A2A3, B1B2, B1B3, B1B4, A1B1, A2B3}. Therefore, the generated initial traversal graph is a comprehensive representation of the relationships in the two data assets that includes all of the relationships of the two data assets, including intra-asset relationships (i.e., relationships {A1A2, A2A3, B1B2, B1B3, B1B4}) and cross-asset relationships {i.e., relationships {A1B1, A2B3}).

FIG. 6 provides an operational example of a traversal graph 600 of relationships associated with six data assets. Some aspects of the traversal graph 600 correspond to properties of an initial traversal graph of the type generated in step/operation 403. As depicted in traversal graph 600, each metadata item 601-607 represents properties of a data asset of the six data assets. For example, metadata item 601 indicates that four connected nodes of the graph 600 each having a red color are associated with the PLAN_BENEFIT_DTLS data asset. The four referenced nodes associated with the metadata item 601 include nodes 611-614. As another example, metadata item 602 indicates that four connected nodes of the graph 600 each having a yellow color associated with the POLICY_INFO data asset. The four referenced nodes associated with the metadata item 602 include nodes 621-624.

The traversal graph 600 of FIG. 6 further includes edges between the nodes that correspond to intra-asset or cross-asset relationships between the respective entities corresponding to the nodes. For example, edge 632 indicates an intra-asset relationship between nodes 611 and 613, both of which correspond to data entities in the data asset POLICY_BENEFIT_DTLS. Similarly, edge 633 indicates an intra-asset relationship between nodes 622 and 624, both of which correspond to data entities in the data asset POLICY_INFO. On the other hand, edge 631 correspond to a cross-asset relationship between node 611, which corresponds to a data entity in the data asset POLICY_BENEFIT_DTLS, and node 622, which corresponds to a data entity in the data asset POLICY_INFO.

The traversal graph 600 of FIG. 6 further depicts that each node and each edge of the traversal graph 600 is associated with an identifier. The data visualization computing entity 106 may generate an identifier for a node of the traversal graph 600 based at least in part on an identifier of the entity associated with the node. Similarly, the data visualization computing entity 106 may generate an identifier of an edge of the traversal graph 600 based at least in part on an identifier of the data field that characterizes a relationship associated with the edge. For example, when a relationship between two data entities is characterized by the equivalence and/or dependence between a first data field of a first data entity of the two data entities and a second data field of a second data entity of the two data entities, the data visualization computing entity 106 may generate the identifier for the edge based at least in part on at least one of an identifier of the first data field and an identifier of the second data field. In some of those embodiments, when the identifier of the first data field and the identifier of the second data field are the same, the data visualization computing entity 106 uses the common identifier as the identifier for the edge corresponding to the relationship characterized by the equivalence and/or dependence relationship between the two data fields. In some other of those embodiments, when the identifier of the first data field and the identifier of the second data field are not the same, the data visualization computing entity 106 adopts a common identifier for the two data fields and uses the common identifier as the identifier for the edge corresponding to the relationship characterized by the equivalence and/or dependence relationship between the two data fields.

At step/operation 404, the data visualization computing entity 106 enriches the initial traversal graph generated in step/operation 403 with determined node properties to generate an updated traversal graph. In some embodiments, to generate the updated traversal graph, the data visualization computing entity 106 adds to the initial traversal graph one or more node properties for each node of the initial traversal graph based at least in part on one or more properties associated with the data entity corresponding to the node. In some of those embodiments, at least some of the data entity properties are data profiling statistics that indicate a feature indicative of structure, content, size, relationship complexity, and/or derivation rule complexity for the data entity. For example, a data entity property for a data entity may indicate a measure of degree based on the data fields associated with the data entity, for example the number of data fields (i.e., the number of columns) of a data entity that is a relational data table. Other examples of data entity properties for a data entity may relate to a number of data entries (e.g., rows) of the data entity, a ratio of redundant data entries (e.g., redundant columns in a data entity), a ratio of data fields of the data entity that relate to data fields in other data entities, etc.

At step/operation 405, the data visualization computing entity 106 generates a custom visualization of the updated traversal graph generated in step/operation 404. In some embodiments, the custom visualization enables searching the updated traversal graph based at least in part on nodes. For example, the custom visualization may enable entering an identifier of an entity to locate the node associated with the entity in the updated traversal graph (e.g., by rendering a view of the graph in which the corresponding node has a prominent location). In some embodiments, the custom visualization of the updated traversal graph may enable searching the updated traversal graph based at least in part on edges. For example, the custom visualization may enable entering an identifier of a relationship to locate the edge associated with edge in the updated traversal graph (e.g., by rendering a view of the graph in which the corresponding edge and its associated nodes have a prominent location). In some embodiments, the custom visualization enables searching the updated traversal graph based at least in part on node properties. For example the custom visualization may enable entering a desired value or range of values for an entity property and displaying an indication of each node of the updated traversal graph whose corresponding node properties correspond to the desired value or range of values. In some of those embodiments, each indication of a node may enable locating the node in the updated traversal graph (e.g., by clicking on the indication to render a view of the graph in which the corresponding node has a prominent location).

In some embodiments, the custom visualization enables finding a recommended path (also referred to as a recommended travel path) between two nodes in the updated traversal graph. A path between two particular nodes may be an execution plan for merging (e.g., joining) two entities, such as an execution plan that indicates a combination (e.g., an ordered combination) of one or more mergers (e.g., relational joins) of entities that produces a merger of the two particular nodes. The recommended path between two nodes may be a path between the two nodes that is deemed to be more optimal (e.g., least likely) than other possible paths between the two nodes. In some cases, there may be multiple possible paths for generating a merger of two nodes. For example, given entity relationships {AB, AC, AD, BF, CF, DF, DG, FG}, there are multiple possible paths for obtaining a merger of entities A and G. The multiple possible paths include {AB→BF→FG}, {AC→CF→FG}, {AD→DG}, and {AD→DF→FG}. The custom visualization engine may be a path from the mentioned multiple paths that is deemed most optimal (e.g., least costly).

In some embodiments, the data visualization computing entity 106 generates (e.g., via a display interface) a recommendation output that includes an indication of the recommended path, such as an indication of a relationship between the recommended path and a traversal graph of a multi-asset database. In some embodiments, the indication of a relationship between the recommended path and a traversal graph of a multi-asset database includes an indication of the custom visualization generated in step/operation 405. In some embodiments, the custom visualization includes an indication of the recommended path and the recommendation output includes the custom visualization.

FIG. 7 provides an example custom visualization UI 700 generated by the data visualization computing entity 106. The custom visualization UI 700 enables requesting a recommended path between two entities by entering identifiers for the two entities in UI elements 701 and 702. In response to receiving a request for a recommended path between two nodes, the custom visualization user interface 700 displays indications of some possible paths (e.g., all possible paths and/or top n most optimal possible paths) between the two nodes in the sidebar UI element 703 (e.g., indications 721-724, each of which includes a measure of cost of each corresponding possible path between the two nodes). Moreover, also in response to receiving a request for a recommended path between two nodes, the custom visualization user interface 700 displays a subgraph of an underlying graph of multiple data assets that includes nodes and edges associated with the recommended path. For example, UI element 704 includes a sub-graph that depicts the optimal path between node 711 (corresponding to the entity whose identifier has been entered in UI element 701) and node 712 (corresponding to the entity whose identifier has been entered in UI element 702).

In some embodiments, to determine a recommended path between two data entities, the data visualization computing entity 106 determines a cost for each path of multiple possible paths between the two data entities. In some embodiments, determining the cost for a path between two data entities may be performed using the process 800 of FIG. 8. As depicted in FIG. 8, the process 800 begins at step/operation 801 with determining a first cost element for the path based at least in part on a measure of relationship strength for each relationship of one or more relationships associated with the path. The measure of relationship strength for a relationship may depend on dynamic parameters that depend on properties of a request for a recommended path as well as static parameters that do not depend on such properties for a request for a recommended path (and thus can, for example, be precomputed). In some embodiments, to avoid utilizing weaker relationships, the data visualization computing entity 106 decreases the first cost element for a path in proportion to a statistical measure (e.g., a median or a mean) of the measures of relationship strength associated with the relationships in the path.

For example, to determine the measure of strength for a relationship, the data visualization computing entity 106 may use the number of data fields (e.g., relational columns) likely to be generated by a merger of the data entities associated with the relationship (i.e., the degree of the relationship). As another example, to determine the measure of strength for a relationship, the data visualization computing entity 106 may use the number or data records (e.g., relational rows) likely to be generated by a merger of the data entities associated with the relationship (i.e., the cardinality of the relationship). The cardinality of a relationship and the degree of a relationship may be both static parameters that can be precomputed prior to runtime of the process 800 based at least in part on number of data fields and/or data records associated with the particular relationship. In some embodiments, to avoid costly mergers, the data visualization computing entity 106 reduces the measure of strength for a relationship based at least in part on at least one of the cardinality of the particular relationship and the degree of the particular relationship.

As another example, to determine the measure of strength for a relationship, the data visualization computing entity 106 may use a record fallout ratio for the relationship, where the record fallout ratio for a relationship may be determined based at least in part on a ratio of a first number of data records estimated to be generated by a first merger of the entities associated with the first path but subsequently filtered without further utilization to a second number of all data records estimated to be generated by the first merger. The record fallout ratio for a relationship may be a dynamic parameter that indicates an aspect of redundancy of a relationship to a path between two nodes involving the particular relationship. The record fallout ratio may for example be very high when the path between two relatively sparse (i.e., relatively less dense) entities involves a merger involving a relatively dense entity. In some embodiments, the strength of the relationship, may also be determined based on the degree of at least one of the nodes corresponding to data entities associated with the relationship. In some embodiments, to avoid costly and/or redundant mergers, the data visualization computing entity 106 reduces the measure of strength for a relationship based at least in part on the record fallout ratio for the relationship.

At step/operation 802, the data visualization computing entity 106 determines a second cost element for the path based at least in part on the traversal cost of each relationship associated with the path. In some embodiments, the data visualization computing entity 106 determines the traversal cost for a relationship based at least in part on reported cost optimizer statistics for one or more data assets associated with the relationship and/or cost optimizer statistics for a processing engine where the one or more data assets are maintained and processed. The data visualization computing entity 106 may determine traversal cost for a relationship based at least in part on physical resource cost (e.g., processing cost, network cost, network delay cost, etc.) associated with merger of the data entities associated with the relationship.

In some embodiments, the data visualization computing entity 106 determines a traversal cost for a relationship between entities in the same data asset based at least in part on merger execution costs associated with mergers of entities of the data asset (e.g., a unit merger execution cost and/or a merger execution cost that takes into accounts traversal costs within a storage unit, such as traversal costs between various components of a storage unit that stores various data entities of a data asset). In some embodiments, the data visualization computing entity 106 determines a traversal cost for a relationship between entities in different data assets based at least in part on merger execution costs associated with mergers of entities of different data assets as well as based at least in part on network costs for transmission of information from computing entities associated with the data assets to a computing entity associated with cross-asset mergers, e.g., the data visualization computing entity 106.

At step/operation 803, the data visualization computing entity 106 determines a third cost element for the path based at least in part on experiential usage of the path. The experiential usage of the path may be a measure of past usage and/or popularity of a particular path, for example past usage and/or particularity of a particular path to a group of users related to and/or associated with a user who has requested a recommended path between two nodes (e.g., users within an organization unit of the user). In some embodiments, the data visualization computing entity 106 applies collaborative filtering based at least in part on experiential usage of multiple paths to determine the third cost element for each path in the multiple paths. In some embodiments, the data visualization computing entity 106 determines the third cost element based on data about past operation of the data analytics system 101, such as data about a rate of historic usage of each path associated with the data analytics system 101.

At step/operation 804, the data visualization computing entity 106 determines the cost for the path based at least in part on the first cost measure for the path determined in step/operation 801, the second cost measure for the path determined in step/operation 802, and the third cost measure for the path determined in step/operation 803. In some embodiments, the data visualization computing entity 106 combines the first cost measure for the path, the second cost measure for the path, and the third cost measure for the path in an algorithm that receives as inputs those cost measures and generates as output a total cost for the path. In some embodiments, to combine the first cost measure for the path, the second cost measure for the path, and the third cost measure for the path to generate the total cost for the path, the noted algorithm uses a trained machine learning model, such as a trained machine learning generated using historic training data related to past operations of the data visualization computing entity 106.

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

For example, the foregoing description provides various examples of utilizing systems and methods for monitoring cognitive capability of a user. However, it should be understood that various embodiments of the systems and methods discussed herein may be utilized for providing reminders of any activity, such as exercising, eating healthy snacks, performing a particular task, calling another individual, and/or the like.

The invention claimed is:

1. A computer-implemented method for data modeling in a database with a plurality of data entities and a plurality of data assets each comprising at least one data entity of the plurality of data entities, the computer-implemented method comprising:

receiving, by an analytics system and originating from a client device, a request for generating an execution plan for a merger of a first data entity of the plurality of data entities and a second data entity of the plurality of data entities, wherein (a) the merger comprises joining data associated with the first data entity and the second data entity, and (b) the request is transmitted by the client device;

obtaining, by the analytics system, a traversal graph of the plurality of data assets, wherein the traversal graph (a) indicates one or more entity relationships, and (b) each entity relationship of the one or more entity relationships is associated with a third data entity of the plurality of data entities and a fourth data entity of the plurality of data entities;

determining, by the analytics system and based at least in part on the traversal graph, one or more possible paths for the execution plan, wherein each possible path of the one or more possible paths is associated with an ordered combination of one or more path relationships of the one or more entity relationships that begins with the first data entity and ends with the second data entity;

determining, by the analytics system, a cost for each possible path of the one or more possible paths based at least in part on at least one of a strength measure associated with each path relationship of the one or more path relationships in the ordered combination for the possible path, a traversal cost measure for each path relationship of the one or more path relationships in the ordered combination for the possible path, or an experiential usage measure for the possible path;

selecting, by the analytics system, a recommended path from the one or more possible paths based at least in part on the respective costs for each possible path of the one or more possible paths; and generating and transmitting, by the analytics system, a recommendation output, wherein (a) the recommendation output is based at least in part on the recommended path, and (b) the recommendation output is displayed via a display interface of the client device.

2. The computer-implemented method of claim 1, wherein the determining the cost for each possible path comprises determining the cost based at least in part on each of the strength measure, the traversal cost measure, and the experiential usage measure.

3. The computer-implemented method of claim 1, wherein the strength measure for a first path relationship of the one or more path relationships is determined based at least in part on an estimated degree of the first path relationship and the estimated degree of the first path relationship is determined based at least in part on a number of data fields estimated to be generated by a merger of the entities associated with the first path relationship.

4. The computer-implemented method of claim 1, wherein the strength measure for a first path relationship of the one or more path relationships is determined based at least in part on an estimated cardinality of the first path relationship and the estimated cardinality of the first path relationship is determined based at least in part on a number of data entries estimated to be generated by a merger of the entities associated with the first path relationship.

5. The computer-implemented method of claim 1, wherein the strength measure for a first path relationship of the one or more path relationships is determined based at least in part on an estimated record fallout ratio of the first path relationship and the estimated record fallout ratio of the first path relationship is determined based at least in part on a ratio of a first number of data records estimated to be generated by a first merger of the entities associated with the first path relationship but subsequently filtered without further utilization to a second number of all data records estimated to be generated by the first merger.

6. The computer-implemented method of claim 1, wherein the traversal cost measure for a first path relationship of the one or more path relationships is determined based at least in part on at least one resource cost measure associated with performing a merger of the entities associated with the first path relationship.

7. The computer-implemented method of claim 1, wherein the experiential usage measure for a first possible path of the one or more possible paths is determined based at least in part on a rate of historic usage of the first possible path.

8. The computer-implemented method of claim 1, further comprising:
generating a graph representation of the plurality data assets, wherein the graph representation comprises a plurality of nodes each corresponding to an entity of the plurality of entities and a plurality of edges each corresponding to an entity relationship of the one or more entity relationships; and
generating a custom visualization of the database based at least in part on the graph representation.

9. The computer-implemented method of claim 8, wherein the generating the custom visualization comprises:
receiving a query associated with an entity identifier, wherein the entity identifier is associated with a fifth data entity of the plurality of data entities;
generating a subgraph representation of the database by filtering a first portion of the graph representation and preserving a second portion of the graph representation, wherein the first portion comprises the fifth data entity and any one or more fifth entity relationships associated with the fifth data entity; and
generating the custom visualization to comprise a first user interface element that comprises indications of the subgraph representation.

10. The computer-implemented method of claim 8, wherein the generating the custom visualization comprises:
receiving a query associated with a relationship identifier, wherein the relationship identifier is associated with a first entity relationship of the one or more entity relationships;
generating a subgraph representation of the database by filtering a first portion of the graph representation and preserving a second portion of the graph representation, wherein the first portion comprises the first entity relationship and all entities of the plurality of entities that are associated with the first entity relationship; and
generating the custom visualization to comprise a first user interface element that comprises indications of the subgraph representation.

11. The computer-implemented method of claim 8, wherein the generating the graph representation comprises:
obtaining one or more asset data items;
determining one or more cross-asset relationships, wherein each cross-asset relationship is between a fourth data entity of a first data asset of the plurality of data assets and a fifth data entity of second data asset of the plurality of data assets;
generating a node data item for each data entity of the plurality of data item;
generating a first edge data item for each entity relationship of the one or more entity relationships between node data items corresponding to data entities of the plurality data entities that are associated with the entity relationship;
generating a second edge data item for each cross-asset relationships of the one or more cross-asset relationships between node data items corresponding to the data entities of the plurality data entities that are associated with the cross-asset relationship; and
generating the graph representation based at least in part on each node data item, each first edge data item, and each second edge data item.

12. The computer-implemented method of claim 8, wherein the custom visualization comprises an indication of the recommended path and the recommendation output comprises the custom visualization.

13. The computer-implemented method of claim 1, wherein the recommendation output comprises an indication of a relationship between the recommended path and the traversal graph of the plurality of data assets.

14. An analytics system for data modeling in a database with a plurality of data entities and a plurality of data assets each comprising at least one data entity of the plurality of data entities, the apparatus comprising at least one processor and at least one memory including program code, the at least one memory and the program code configured to, with the processor, cause the analytics system to at least:
receive, originating from a client device, a request for generating an execution plan for a merger of a first data entity of the plurality of data entities and a second data entity of the plurality of data entities, wherein (a) the merger comprises joining data associated with the first data entity and the second data entity, and (b) the request is transmitted by the client device;
obtain a traversal graph of the plurality of data assets, wherein the traversal graph (a) indicates one or more entity relationships, and (b) each entity relationship of the one or more entity relationships is associated with a third data entity of the plurality of data entities and a fourth data entity of the plurality of data entities;
determine, based at least in part on the traversal graph, one or more possible paths for the execution plan, wherein each possible path of the one or more possible paths is associated with an ordered combination of one or more path relationships of the one or more entity relationships that begins with the first data entity and ends with the second data entity;
determine a cost for each possible path of the one or more possible paths based at least in part on at least one of a strength measure associated with each path relationship of the one or more path relationships in the ordered combination for the possible path, a traversal cost measure for each path relationship of the one or more path relationships in the ordered combination for the possible path, or an experiential usage measure for the possible path;
select a recommended path from the one or more possible paths based at least in part on the respective costs for each possible path of the one or more possible paths; and
generate and transmit a recommendation output, wherein (a) the recommendation output is based at least in part on the recommended path, and (b) the recommendation output is displayed via a display interface of the client device.

15. The analytics system of claim 14, wherein the determining the cost for each possible path comprises determining the cost based at least in part on each of the strength measure, the traversal cost measure, and the experiential usage measure.

16. The analytics system of claim 14, wherein the strength measure for a first path relationship of the one or more path relationships is determined based at least in part on an estimated degree of the first path relationship and the estimated degree of the first path relationship is determined based at least in part on a number of data fields estimated to be generated by a merger of the entities associated with the first path relationship.

17. The analytics system of claim 14, wherein the strength measure for a first path relationship of the one or more path relationships is determined based at least in part on an estimated cardinality of the first path relationship and the estimated cardinality of the first path relationship is determined based at least in part on a number of data entries estimated to be generated by a merger of the entities associated with the first path relationship.

18. The analytics system of claim 14, wherein the strength measure for a first path relationship of the one or more path relationships is determined based at least in part on an estimated record fallout ratio of the first path relationship and the estimated record fallout ratio of the first path relationship is determined based at least in part on a ratio of a first number of data records estimated to be generated by a first merger of the entities associated with the first path relationship but subsequently filtered without further utilization to a second number of all data records estimated to be generated by the first merger.

19. The analytics system of claim 14, wherein the traversal cost measure for a first path relationship of the one or more path relationships is determined based at least in part on at least one resource cost measure associated with performing a merger of the entities associated with the first path relationship.

20. A non-transitory computer-readable storage medium for data modeling in a database with a plurality of data entities and a plurality of data assets each comprising at least one data entity of the plurality of data entities, the computer-readable storage medium storing program code instructions that, when executed, cause an analytics system to:

receive, originating from a client device, a request for generating an execution plan for a merger of a first data entity of the plurality of data entities and a second data entity of the plurality of data entities, wherein (a) the merger comprises joining data associated with the first data entity and the second data entity, and (b) the request is transmitted by the client device;

obtain a traversal graph of the plurality of data assets, wherein the traversal graph (a) indicates one or more entity relationships, and (b) each entity relationship of the one or more entity relationships is associated with a third data entity of the plurality of data entities and a fourth data entity of the plurality of data entities;

determine, based at least in part on the traversal graph, one or more possible paths for the execution plan, wherein each possible path of the one or more possible paths is associated with an ordered combination of one or more path relationships of the one or more entity relationships that begins with the first data entity and ends with the second data entity;

determine a cost for each possible path of the one or more possible paths based at least in part on at least one of a strength measure associated with each path relationship of the one or more path relationships in the ordered combination for the possible path, a traversal cost measure for each path relationship of the one or more path relationships in the ordered combination for the possible path, or an experiential usage measure for the possible path;

select a recommended path from the one or more possible paths based at least in part on the respective costs for each possible path of the one or more possible paths; and generate and transmit a recommendation output, wherein (a) the recommendation output is based at least in part on the recommended path, and (b) the recommendation output is displayed via a display interface of the client device.

* * * * *